United States Patent
Field et al.

[15] 3,684,777
[45] Aug. 15, 1972

[54] NOVEL INTERPOLYMERS USEFUL AS THICKENING AGENTS

[72] Inventors: Nathan D. Field, 2736 Liberty St., Allentown, Pa. 18104; Earl P. Williams, 803 Applegate Ave., Pen Argyl, Pa. 18072

[22] Filed: March 20, 1970

[21] Appl. No.: 21,486

[52] U.S. Cl................260/78.5 T, 71/7, 167/87, 167/87.1, 167/91, 260/29.1 R, 260/29.2 R, 260/29.6 RB, 260/30.2, 260/30.6 R, 260/32.6 N, 260/33.4 PQ, 260/78 UA
[51] Int. Cl...................................C08f 27/12
[58] Field of Search..........................260/78.5 T

[56] References Cited

UNITED STATES PATENTS

| | | | |
|---|---|---|---|
| 2,977,334 | 3/1961 | Zopf et al. | 260/27 |
| 3,398,092 | 8/1968 | Fields et al. | 210/24 |
| 2,921,930 | 1/1960 | Suhrie | 260/78.5 |
| 2,698,316 | 12/1954 | Giammaria | 260/78 |
| 3,506,625 | 4/1970 | Patinkin et al. | 260/78.5 |
| 3,436,378 | 4/1969 | Azorlosa et al. | 260/78.5 |
| 3,499,876 | 3/1970 | Field et al. | 260/78.5 |

*Primary Examiner*—Joseph L. Schofer
*Assistant Examiner*—John Kight, III
*Attorney*—Samson B. Leavitt, Walter C. Kehm and Alvin H. Fritschler

[57] ABSTRACT

An interpolymer composition comprising:

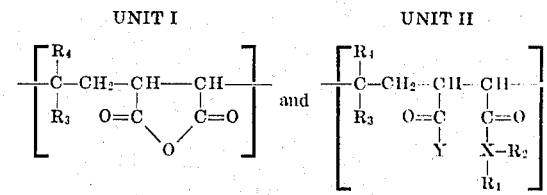

Wherein
Y represents —OH and O—$R_1$ and

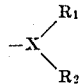

Y and $R_2$ together represent a single bond of an imide ring.
X represents either

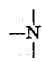

or —O—.

$R_1$ represents the same or different hydrocarbon radicals containing from about $C_6$ to about $C_{36}$ carbon atoms selected from the group consisting of normal chain alkyl, branched chain alkyl, cycloalkyl and alkylaryl radicals.

$R_2$ represents H or the same or different hydrocarbon radicals containing from about $C_1$ to about $C_{30}$ carbon atoms selected from the group consisting of normal chain alkyl, branched chain alkyl, cycloalkyl, and alkylaryl radicals wherein the sum total of carbon atoms represented by $R_1$ and $R_2$ is not greater than $C_{36}$ (when X=O, or an imide nitrogen, $R_2$ does not exist).

$R_3$ represents either hydrogen, methyl, ethyl or phenyl.

$R_4$ represents either hydrogen or methyl, which compounds are particularly useful as thickening agents for solutions of high ionic strength.

7 Claims, No Drawings

NOVEL INTERPOLYMERS USEFUL AS THICKENING AGENTS

The instant invention is directed to novel interpolymer compositions. In particular, the instant invention is directed to interpolymer compositions which contain a moderate amount of a long chain component in the amide, imide or ester portion of a derivative of a copolymer of maleic anhydride and styrene or maleic anhydride and a lower olefin.

The instant novel compounds have been found to be very useful in thickening solutions of high ionic strength, including concentrated salt solutions as well as bases and acids where most conventional water-soluble polymers have little effect or are insoluble. For example, the instant interpolymers are very effective in thickening 15 percent diammonium phosphate solution, which is used in fire-fighting and 20 percent tetrapotassium pyrophosphate which is used in detergent compositions and 5 percent sodium bromate which is used in permanent wave formulations. Moreover, the instant interpolymers are very effective for thickening concentrated ammonia as well as for thickening other strong alkali solutions such as sodium hydroxide, sodium carbonate, trisodium phosphate and sodium silicate. The thickened ammonia solutions are useful as agricultural fertilizers and the thickened strongly alkaline solutions are useful as heavy duty cleaners, paint removers, oven cleaners, etc. Moreover, the instant compounds may be used to thicken water and rubber latices as well as nonaqueous solutions or mixtures of nonaqueous and aqueous solutions such as glycerine, ethylene glycol, alcohols, methyl ethyl ketone, acetone, dimethyl formamide, dioxane as well as water solutions of the above. The instant compounds are also useful as gelling agents in cosmetic formulations such as shampoos, hand lotions, shaving creams, etc. The above solutions and dispersions have good stability upon storage, in fact some of them have even exhibited increased viscosity values upon storage.

A primary object of the instant invention is to provide novel interpolymer compounds comprising substantially equimolar quantities of maleic anhydride and a vinyl monomer having the formula:

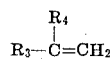

wherein $R_3$ represents either hydrogen, methyl, ethyl or phenyl, and $R_4$ represents either hydrogen or methyl.

More specifically, interpolymers of the instant invention are those polymers having the following structural units:

UNIT I and UNIT II

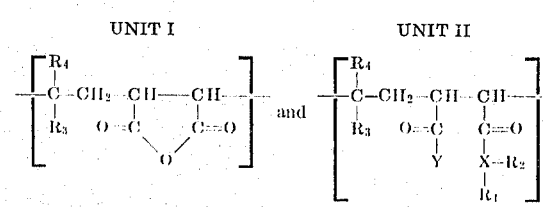

wherein structural Unit I represents about 94 to 99.5 mole percent and structural Unit II represents from about 6 to about 0.5 mole percent of the interpolymer. It is to be noted that preferably structural Unit I represents about 95 to 99 mole percent and structural Unit II represents about 1 to 5 mole percent, and wherein Y represents —OH and O—$R_1$ and

Y and $R_2$ together represent a single bond of an imide ring.

X represents either

or —O—.

$R_1$ represents the same or different hydrocarbon radicals containing from about $C_6$ to about $C_{36}$ carbon atoms selected from the group consisting of normal chain alkyl, branched chain alkyl, cycloalkyl and alkylaryl radicals.

$R_2$ represents H or the same or different hydrocarbon radicals containing from about $C_1$ to about $C_{30}$ carbon atoms selected from the group consisting of normal chain alkyl, branched chain alkyl, cycloalkyl, and alkylaryl radicals wherein the sum total of carbon atoms represented by $R_1$ and $R_2$ is not greater than $C_{36}$. (Furthermore, when X is O, or an imide nitrogen, $R_2$ does not exist).

$R_3$ represents either hydrogen, methyl, ethyl or phenyl.

$R_4$ represents either hydrogen or methyl.

The molecular weight of the polymers of the instant invention may be conveniently defined by the specific viscosity of the precursor copolymer. That is to say, that the molecular weight of the subject interpolymers may conveniently be defined by the specific viscosity of the copolymer wherein Unit I and Unit II are both totally anhydride units prior to the amidation or esterification of Unit II. In such instances, 1.00 gram of the anhydride copolymer per 100 ml. of acetone solution should have a specific viscosity at 25° C. in the range of from about 0.1 to 25.0. Preferably said anhydride copolymers should have a specific viscosity at 25° in acetone from about 0.2 to about 20.0.

The novel compounds of the instant invention may be prepared by conventional known methods. For example, by interpolymerizing maleic anhydride and a vinyl monomer using approximately 1 mole of maleic anhydride per mole of vinyl monomer. A small molar excess of the vinyl monomer mixture (5 to 10 percent) above that of the maleic anhydride may be advantageous for ensuring complete conversion of the maleic anhydride.

The polymerization may be carried out conveniently by preparing a solvent solution of the monomers and adding a catalytic amount (preferably from 0.01 to 1.0 percent), of an organic free-radical-generating initiator. Then the resulting solution is mixed thoroughly and heated sufficiently so that the polymerization reaction takes place. At the completion of the polymerization reaction the precipitated interpolymer is isolated by any suitable means, such as by filtration, washed with fresh solvent and vacuum dried. Moreover, the polymerization may also be conducted by adding a solution of the vinyl monomer to a solution of initiator, maleic anhydride and solvent.

The amount of solvent is not critical and such solvents as benzene, toluene, xylene, acetone, methyl ethyl ketone, and methylene chloride, and the like may be used. However, benzene is considered the most suitable from the standpoint of product isolation and obtaining high molecular weights.

Among the organic free-radical-generating initiators that may be mentioned are azobisisobutyronitrile, benzoyl peroxide, lauroyl peroxide, caprylyl peroxide, acetyl peroxide, acetyl benzoyl peroxide, di-tert-butyl peroxide or dimethyl azoisobutyrate and the like. Mixtures of such catalysts are also suitable in the process of making the interpolymers of the invention. Radiation polymerization can be used, too, e.g., such high energy radiation sources as ultra violet light, X-rays, $\gamma$-rays, neutrons and the like can be used to initiate polymerization.

The polymerization may be carried out at a temperature within the range of 0° to 150°, preferred temperatures lie for the most part in the range from 40° to 100° C., particularly about 60° to 80° C.

Other techniques for the polymerization of maleic anhydrides with vinyl monomers are set forth in U.S. Pat. No. 2,378,629, which is incorporated herein by reference.

Subsequent to the preparation of the precursor copolymer, said copolymer may then be reacted with a monoamino primary or secondary amine containing about six to 36 carbon atoms in molar amounts of 0.5 to about 6 percent of the total anhydride content. Conditions for the formation of such amides are well known in the art and are set forth in U.S. Pat. No. 2,456,177, which is incorporated herein be reference. In general, such amidation requires the reaction of the copolymer precursor in a suitable solvent with an amine as defined above for a period of time from about 10 to 30 hours at a temperature from about 20° to about 35° C. Subsequent to such reaction, the resultant interpolymer may be separated by filtration or other techniques, washed with fresh solvents and dried. Exemplary of the amines which are suitable for use in connection with the present invention are the following:

hexyl amine
heptyl amine
octyl amine
nonyl amine
decyl amine
hendecyl amine
dodecyl amine
tetradecyl amine
hexadecyl amine
octadecyl amine
oleyl amine
stearyl amine
octadecadienylamine
2-aminooctane
tertiary nonylamine
coconut fatty amine
soya fatty amine
tallow fatty amine
hydrogenated tallow fatty amine
tall oil amine
rosin amine
cyclohexyl amine
benzylamine
di-n-propylamine
di-iso-propylamine
dibutyl amine
diamylamine
didodecylamine
dioctadecylamine
tridecylamine
2-ethylhexylamine
di-(2-ethylhexyl) amine
N-methyl dodecylamine
N-ethyl tetradecylamine
iso-decylamine In addition to the above specific amines, mixtures thereof in any proportion may be used.

The partial esters of the subject interpolymers may be prepared by reaction of the precursor anhydride copolymer with a monohydric hydrophobic alcohol containing from about 6 to about 36 carbon atoms in molar amounts of from about 0.5 to about 6 percent of the total anhydride content. Such esterification procedures are well known in the art and conditions therefor are set forth in U.S. Pat. No. 2,938,887, which is incorporated herein by reference. In general, the partial esterification reaction requires the mixing of the precursor copolymer in solution with an alcohol as defined above for an extended period of time at a temperature from about 10° to 200°, and preferably from 20° to 120° C. Exemplary of the alcohols which may be employed in connection with the instant invention are:

N-hexanol
n-heptanol
n-octanol
n-nonanol
n-decanol
n-dodecanol
n-tetradecanol
n-hexadecanol
n-octadecanol
oleyl alcohol
branched chained alcohols such as sec-octanol,
pentamethyloctanol
tetramethylnonanol
diethyloctanol In addition to the above alcohols, those alcohols which are prepared by the catalytic reaction of an olefin such as tripropylene, tetrapropylene, pentapropylene and the like with carbon monoxide and hydrogen to form an aldehyde followed by the catalytic reduction of such aldehyde to an alcohol may also be employed. The above-noted process is known as the oxo process. Furthermore, alcohols such as cyclohexanol, $\alpha$-terpineol, cholesterol, benzyl alcohol, $\beta$-phenylethyl alcohol, cinnamyl alcohol, citronellol and the like, as well as mixtures of any of the above, may also be employed. Furthermore, commercially available mixtures such as "Lorol 5" which contains a mixture of $C_{10}$ to $C_{18}$ alcohols may be used.

The partial imide of the subject interpolymers may be prepared by converting all or part of the partial amides formed above by following procedures which are well known in the art. Such procedures are set forth in detail in U.S. Pat. No. 2,313,565, and U.S. Pat. No. 3,053,814, both of which are incorporated herein by reference. In general, the partial imide may be formed by heating the corresponding amide for an extended period of time at a temperature from about 170° to 200° C.

The anhydride interpolymers of this invention may be converted by hydrolysis, neutralization, esterification and the like to compounds having the following structural units:

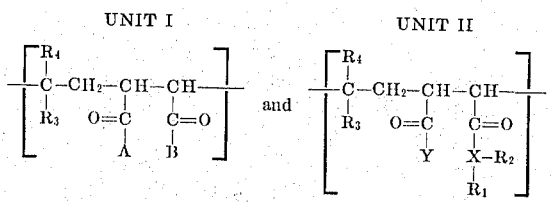

wherein X, Y, $R_1$, $R_2$, $R_3$ and $R_4$ and the mole percentages of Unit I and Unit II have the same meaning as described, and wherein A and B each independently represent a member selected from the group consisting of —OH, —OM, —NH$_2$

alkoxy, and aryloxy, where $Z_1$ and $Z_2$ are selected from the group consisting of hydrogen, alkyl, aryl or together form a ring, and wherein M represents a salt forming cation selected from the group consisting of alkali metals, ammonium and substituted ammonium, such as K, Na, NH$_4$, methylammonium, diethanolammonium, piperidinium, morpholinium, triethanolammonium and the like.

The above water-soluble interpolymers include those ammoniated products involving partial as well as complete conversion of the anhydride moiety such as those compounds containing the ammonium salt-half amide moiety which may be depicted as:

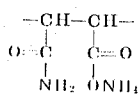

These water-soluble interpolymers may be easily derived from the above-described interpolymers by forming derivatives of the anhydride portion of the polymer, by known hydrolyzing reaction thereof with water, and/or reactions involving primary and secondary alcohols, primary and secondary amines or alkali basic media to form salts, partial ester-salts, or partial amide-salts and the like.

Among the more preferred reactants that may be mentioned are water, ammonia, alkali solutions, such as sodium hydroxide, potassium hydroxide or ammonium hydroxide, etc.; methylamine, piperidine, morpholine, diethanolamine, triethanolamine, etc.; alcohols, such as methanol, ethanol, propanol, and the like; phenols, naphthols, etc.

The invention provides novel interpolymers particularly useful in thickened aqueous systems, i.e., in a composition of matter comprising an aqueous system having therein a thickening amount of the water soluble derivatives of the instant anhydride interpolymers, defined above. Such systems include, for example, water itself, aqueous-alkaline mixtures, aqueous-alcohol mixtures, aqueous-acid systems, aqueous ionic salt mixtures, polymer latices, and the like. Examples of the aqueous ionic salt acid or alkali systems which can be thickened in accordance with present invention include solutions of diammonium phosphate, tetrapotassium pyrophosphate, ammonium hydroxide, sodium hydroxide, sodium bromate, hydrochloric acid, and the like.

The amount of water present in the above-mentioned aqueous systems is in no way critical, as the thickeners employed can be utilized to thicken compositions wherein water is present in only a minor amount to an aqueous system, per se. The amount of water present in the aqueous system, therefore, is merely dependent on the use for which the thickened system is intended. In general, however, it is preferred to utilize aqueous solutions containing 1° to 60% ionic material.

Furthermore, the amount of thickener to be employed in the aqueous compositions will vary according to the desired result, the system employed, and as a practical matter, the general economic considerations. In general, however, a range of from about 0.1 percent to about 15 percent by weight of the total aqueous composition is employed, although greater or lesser amounts can be advantageously employed when desired.

The use of the instant thickeners in the above aqueous systems is indeed unique. For example, in many ionic solutions using standard thickeners, the viscosity decreases as the ionic content increases. Hence, it was unexpected that the viscosity increased with ionic content when using the novel subject thickeners.

The following examples are illustrative of the present invention and are not to be regarded as limitative. It is to be understood that all parts, percentages and proportions referred to herein and in the appended claims are by weight unless otherwise indicated. The viscosities listed in the following examples were obtained with a Brookfield rotation viscometer and the value expressed in centipoises.

EXAMPLE I

A 5 mole percent hydrogenated tallow amide of ethylene maleic anhydride copolymer was prepared by dissolving 12.6 g. (0.1 mole) of ethylene maleic anhydride copolymer (specific viscosity 1 percent in acetone 0.58) in 300 ml. of C. P. Acetone in a 500 ml. reaction flask equipped with stirrer, reflux condenser and thermometer. 1.5 g. (0.005 moles) of hydrogenated tallow fatty amines, comprising a mixture of 25 percent of hexadecyl amine, 70 percent of octadecyl amine and 5 percent of octadecadienylamine previously dissolved in 10 ml. of C. P. methyl ethyl ketone, was then added. The solution was stirred for 20 hours at 27° to 28° C. and then poured into 600 ml. of normal heptane. The liquid was decanted from the polymer solids which were then dried in a high vacuum oven to a constant weight of 13.7 g.

EXAMPLE II

A 4 mole percent hydrogenated tallow amide of styrene maleic anhydride copolymer was prepared by dissolving 10.1 g. (0.05 moles) of styrene maleic anhydride copolymer (specific viscosity 1 percent acetone 1.9) in 300 ml. of C. P. acetone in a 500 ml. reaction flask equipped with stirrer, reflux condenser and thermometer. 0.6 g. (0.002 moles) hydrogenated tallow fatty amines of Example I dissolved in 10.0 ml. of C. P. methyl ethyl ketone was then added thereto. The solution was stirred for 19 hours at approximately 26° to 28° C. and then poured into 1 l. of normal heptane. The liquid was decanted from the polymer solids which were dried in a high vacuum oven to a constant weight of 9.1 g.

EXAMPLE III

An 8 mole percent cetyl alcohol ester of styrene maleic anhydride copolymer was prepared by dissolving 10.1 g. (0.05 moles) styrene maleic anhydride copolymer of Example II in 300 ml. of C. P. acetone in a 500 ml. reaction flask equipped with stirrer, reflux condenser and thermometer. 1.0 g. (0.004 moles) cetyl alcohol dissolved in 10.0 ml. C. P. methyl ethyl ketone was then added to the above. The solution was stirred for 19 hours at a temperature from about 26° to 28° C. and then poured into 600 ml. normal heptane. The liquid was decanted from the polymer solids which were then dried in a high vacuum oven to a constant weight of 9.1 g.

EXAMPLE IV

A solution comprising:

| | G. |
|---|---|
| Interpolymer of Example I | 2.0 |
| Distilled water | 46.0 |
| Ammonia solution, 28.9% | 52.0 | was prepared. The polymer solution exhibited a Brookfield viscosity of 41,600 CPS at 25° C. using a No. 7 spindle and 10 RPM.

For comparison, a control solution was prepared substituting the parent ethylene maleic anhydride copolymer for the novel interpolymer of the instant invention. The resultant solution showed a Brookfield viscosity of 48 CPS.

EXAMPLE V

A solution comprising:

| | G. |
|---|---|
| Interpolymer of Example II | 5.0 |
| Distilled water | 44.9 |
| Ammonia solution, 29.9% | 50.1 | was prepared. The polymer solution exhibited a Brookfield viscosity of 16,080 CPS at 25° C. using a No. 7 spindle and 10 RPM.

EXAMPLE VI

A solution comprising:

| | G. |
|---|---|
| Interpolymer of Example III | 2.5 |
| Distilled water | 21.5 |
| Ammonia solution, 28.9% | 26.0 | was prepared. The polymer solution exhibited a Brookfield viscosity of 2,000 CPS at 25° C. using a No. 7 spindle and 10 RPM.

A comparison solution was prepared using the parent styrene maleic anhydride copolymer, which solution showed a Brookfield viscosity of 560 CPS at 25° C. using a No. 5 spindle and 10 RPM.

EXAMPLE VII

A solution comprising:

| | G. |
|---|---|
| Interpolymer of Example I | 1.0 |
| Distilled water | 46.5 |
| Diammonium phosphate | 2.5 | was prepared. The polymer solution exhibited a Brookfield viscosity of 2,000 CPS at 25° C. using a No. 6 spindle and 10 RPM.

A comparison solution was prepared using the parent ethylene maleic anhydride copolymer in lieu of the interpolymer of the instant invention. This comparison solution showed a Brookfield viscosity of 20 CPS.

EXAMPLE VIII

A solution comprising:

| | G. |
|---|---|
| Interpolymer of Example II | 1.0 |
| Distilled water | 46.5 |
| Diammonium phosphate | 2.5 | was prepared. This polymer solution exhibited a Brookfield viscosity of 4,000 CPS using a No. 7 spindle and 10 RPM.

A comparison solution was prepared using the parent styrene maleic anhydride copolymer in lieu of the novel interpolymer of the instant invention. This comparison solution showed a Brookfield viscosity of 45 CPS using a No. 3 spindle and 10 RPM.

EXAMPLE IX

A solution comprising:

| | G. |
|---|---|
| Interpolymer of Example I | 2.0 |
| Distilled water | 45.5 |
| Sodium carbonate | 2.5 | was prepared. The polymer solution showed a Brookfield viscosity of 5600 CPS using a No. 7 spindle at 10 RPM.

A comparison solution was prepared using the parent ethylene maleic anhydride copolymer in lieu of the novel interpolymer of the instant invention. This comparison solution showed a Brookfield viscosity of 40 CPS using a No. 3 spindle at 10 RPM.

EXAMPLE X

A solution comprising:

| | G. |
|---|---|
| Interpolymer of Example II | 1.0 |
| Distilled water | 46.5 |
| Tetrapotassium pyrophosphate | 2.5 | was prepared. The polymer solution showed a Brookfield viscosity of 9,000 CPS using a No. 6 spindle at 10 RPM.

A comparison solution was prepared using the parent styrene maleic anhydride copolymer in lieu of the novel interpolymer of the instant invention. The comparison solution showed a Brookfield viscosity of 45 CPS using a No. 3 spindle at 10 RPM.

EXAMPLE XI

A 5 mole percent hydrogenated tallow amide of ethylene maleic anhydride copolymer was prepared by heating 50.0 g. of 5 mole percent hydrogenated tallow amide of ethylene maleic anhydride copolymer of Example I for several hours at 180° C.

EXAMPLE XII

A solution comprising:

|  | G. |
|---|---|
| Interpolymer of Example XI | 5.0 |
| Distilled water | 43.0 |
| Ammonia solution, 28.9% | 52.0 | was prepared. The polymer solution was compared with a control in which the parent ethylene maleic anhydride copolymer was used in lieu of the novel interpolymer of the instant invention. The composition containing the novel interpolymer of the instant invention was found to be considerably thicker than the control.

As will be readily appreciated, the foregoing examples clearly delineate the novelty of the instant invention, and further exemplify the fact that the novel interpolymers of said invention are particularly well suited for use as thickening agents in connection with aqueous systems of high ionic strength.

Various modifications and variations of this invention will be obvious to a worker skilled in the art and it is understood that such modifications and variations are to be included within the purview of this application and the spirit and scope of the appended claims.

What is claimed is:

1. An uncrosslinked, water-soluble interpolymer composition comprising:

UNIT I     UNIT II

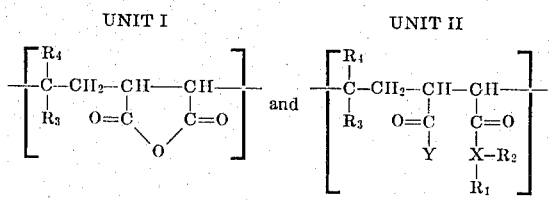

wherein Y represents —OH and —O —$R_1$ and

wherein Y represents —OH and Y and $R_2$ together represent a single bond of an imide ring, X represents either

or —O—, $R_1$ represents the same or different hydrocarbon radicals containing from about $C_6$ to about $C_{36}$ carbon atoms selected from the group consisting of normal chain alkyl, branched chain alkyl, cycloalkyl and alkylaryl radicals, $R_2$ represents H or the same or different hydrocarbon radicals containing from about $C_1$ to about $C_{30}$ carbon atoms selected from the group consisting of normal chain alkyl, branched chain alkyl, cycloalkyl, and alkylaryl radicals wherein the sum total of carbon atoms represented by $R_1$ and $R_2$ is not greater than $C_{36}$ and when X is —O— or an imide nitrogen, $R_2$ does not exist; $R_3$ represents either hydrogen, methyl, ethyl or phenyl and $R_4$ represents either hydrogen or methyl wherein Unit I represents about 94 to 99.5 mole percent and Unit II represents from about 6 to about 0.5 mole percent of the interpolymer, said interpolymer having a specific viscosity range (1 percent in acetone) of from 0.2 to about 20.0.

2. The interpolymer according to claim 1 wherein $R_1$ represents a hydrocarbon radical having from six to 20 carbon atoms.

3. The interpolymer according to claim 1 wherein $R_1$ is an alkyl radical having from six to 20 carbon atoms.

4. The interpolymer according to claim 1 wherein $R_3$ represents a methyl radical.

5. The interpolymer according to claim 1 wherein X represents nitrogen.

6. The interpolymer according to claim 1 wherein X represents oxygen.

7. The interpolymer according to claim 1 wherein $R_1$ is an alkyl radical having 16 carbon atoms.

* * * * *